US005737244A

United States Patent [19]
Ruck

[11] Patent Number: 5,737,244
[45] Date of Patent: Apr. 7, 1998

[54] COORDINATE MEASURING APPARATUS HAVING A CONTROL WHICH DRIVES THE PROBE HEAD OF THE APPARATUS IN ACCORDANCE WITH DESIRED DATA

[75] Inventor: Otto Ruck, Ellwangen-Pfahlheim, Germany

[73] Assignee: Carl-Zeiss-Stiftung, Heidenheim, Germany

[21] Appl. No.: 693,633

[22] Filed: Aug. 9, 1996

[30] Foreign Application Priority Data

Aug. 11, 1995 [DE] Germany ............... 195 29 574.9

[51] Int. Cl.$^6$ ............... G05B 19/19; G05B 19/4073
[52] U.S. Cl. ............... 364/559; 364/191; 364/474.29; 364/474.37; 364/560; 33/503; 33/504; 33/505
[58] Field of Search ............... 364/559, 560, 364/562, 474.17, 474.29, 474.37, 191; 33/503, 504, 505

[56] References Cited

U.S. PATENT DOCUMENTS

| | | | |
|---|---|---|---|
| 4,333,238 | 6/1982 | McMurtry | 33/174 |
| 4,769,763 | 9/1988 | Trieb et al. | 364/559 |
| 4,835,718 | 5/1989 | Breyer et al. | 364/560 |
| 5,291,270 | 3/1994 | Koch et al. | 356/372 |
| 5,425,180 | 6/1995 | Breyer | 33/503 |
| 5,471,406 | 11/1995 | Breyer et al. | 364/559 |
| 5,491,638 | 2/1996 | Georgi et al. | 364/474.37 |
| 5,526,576 | 6/1996 | Fuchs et al. | 33/503 |

FOREIGN PATENT DOCUMENTS 0569694  11/1993  European Pat. Off. .

*Primary Examiner*—James P. Trammell
*Assistant Examiner*—Hien Vo
*Attorney, Agent, or Firm*—Walter Ottesen

[57] ABSTRACT

The control of a coordinate measuring apparatus includes a device for correcting the pregiven desired path when the actual geometry of the workpiece 17 to be measured deviates from the desired geometry. This device is a two-stage controller which includes a first control stage 27 which operates in response to a control signal proportional to the deflection of the moveable probe pin 7 and controls out deviations in the direction of the normal vector $\vec{N}i$ on the workpiece surface. The second control stage 28 becomes active only when the deflection $\vec{A}i$ of the probe pin 7 or the force $\vec{F}$ acting on the workpiece reaches or exceeds a predetermined amount. The second control stage 28 then controls out deviations in the direction of the probe deflection $\vec{A}i$.

16 Claims, 5 Drawing Sheets

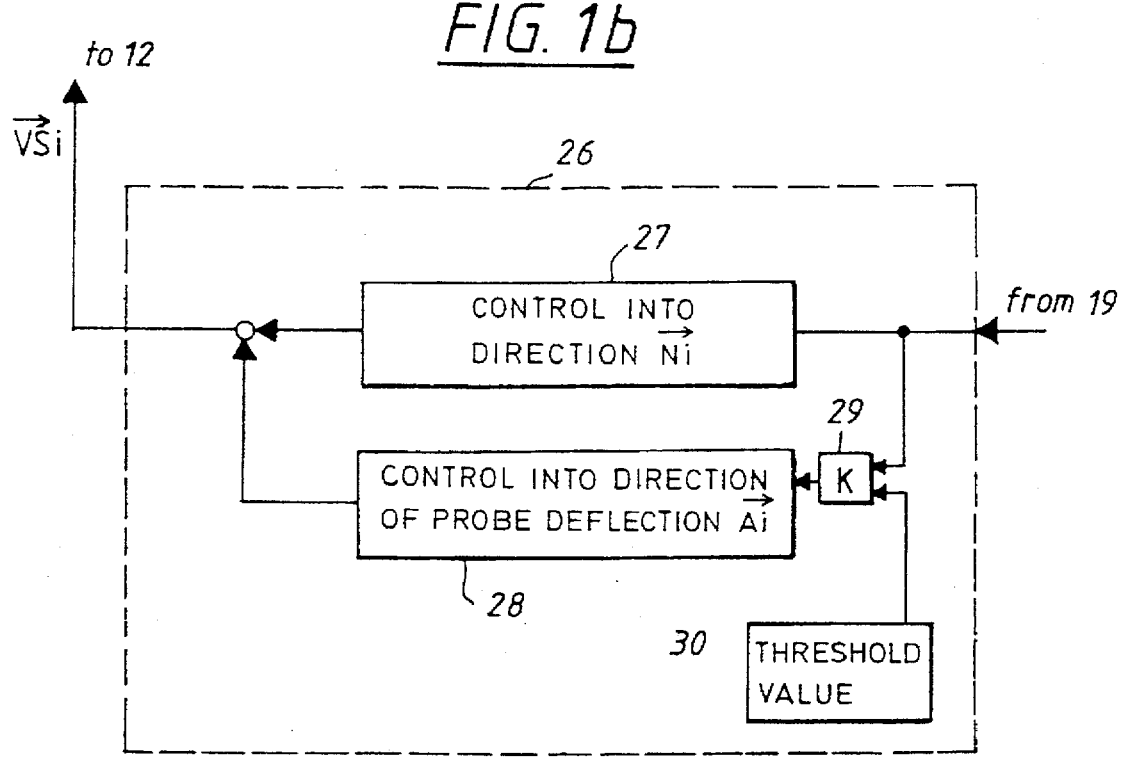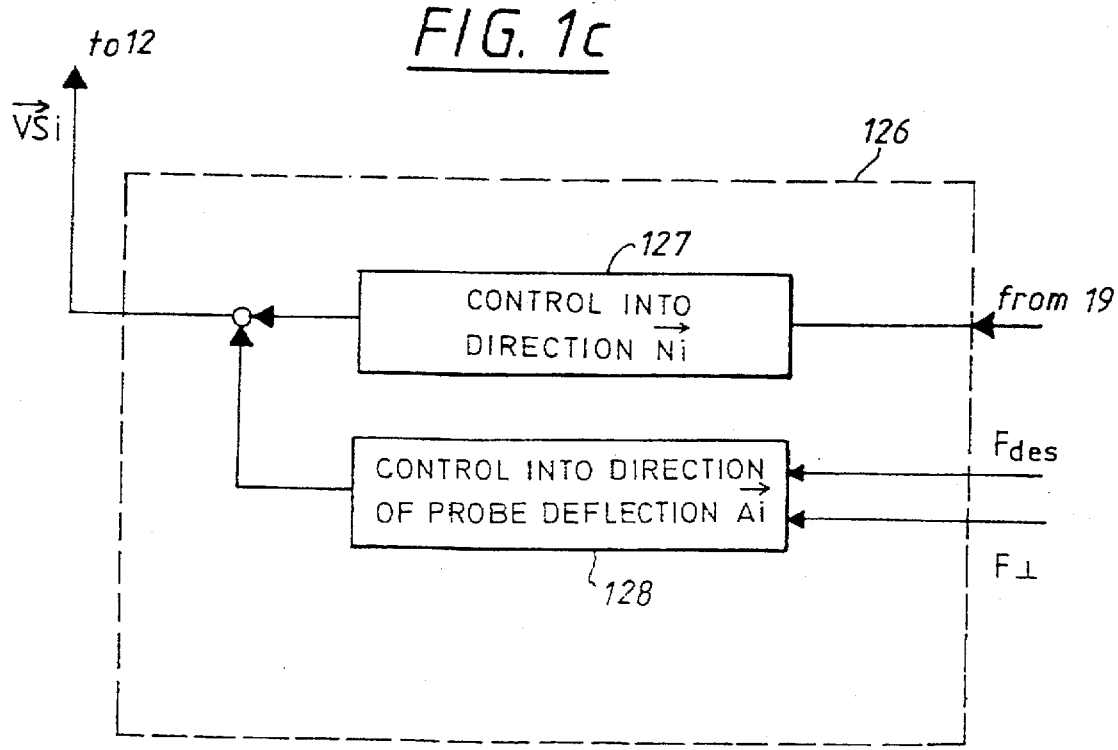

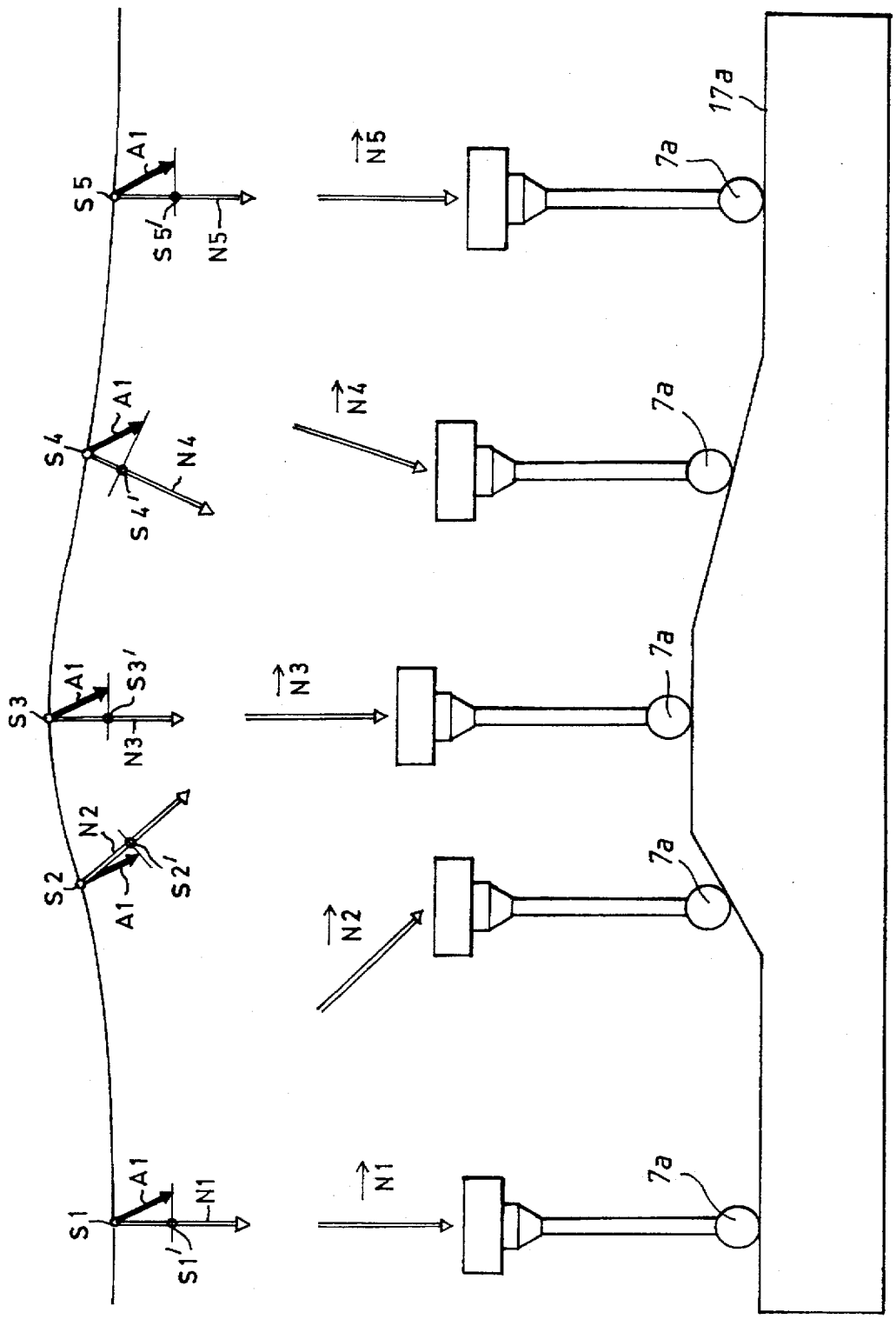

COORDINATE MEASURING APPARATUS HAVING A CONTROL WHICH DRIVES THE PROBE HEAD OF THE APPARATUS IN ACCORDANCE WITH DESIRED DATA

BACKGROUND OF THE INVENTION

Special controls are required for coordinate measurements of workpiece surfaces with a measuring probe head which scans the workpiece surfaces in continuous contact in the so-called scanning method. These controls ensure that the probe head is guided on the desired scanning path.

U.S. Pat. No. 4,769,763 describes a control which permits the independent scanning of unknown workpiece contours in that the absolute value of the scanning speed and the desired probe deflection are pregiven and the direction of the scanning movement is subsequently computed from the measured probe deflection. This direction of the scanning movement runs tangentially to the workpiece surface. This control operates relatively slowly because the thrust direction must always be computed anew from the signals which describe the deflection of the probe pin.

U.S. Pat. No. 5,471,406 discloses a control which moves the probe head of the coordinate measuring apparatus on a pregiven path in accordance with desired data. The path corresponds essentially to the desired geometry of the workpiece surface to be measured. Here, it is assumed that the path to be traveled is precisely known already within the permissible deflection range of the probe pin. For this reason, the workpiece surface can be scanned at a relatively high speed which becomes manifest in a drastic shortening of the measurement time compared to the state of the art mentioned above. However, problems occur when the actual workpiece geometry departs to an extent from the desired geometry which is greater than the permissible deflection of the probe pin. The known control does have a device for correcting the path when the deflection of the probe pin approaches the limits of its measuring range in the course of the scanning movement. In such a case, the path data are shifted by a constant amount away from the workpiece surface. In this way, only relatively "friendly" deviations between desired and actual geometries are taken into account.

SUMMARY OF THE INVENTION

In view of the foregoing, it is an object of the invention to provide a control for a coordinate measuring apparatus with which workpiece surfaces can be scanned quickly also when greater deviations between desired and actual geometries occur or for the case wherein the position of the workpiece cannot be precisely determined in advance of the measurement.

The coordinate measuring apparatus of the invention is for measuring the surface of a workpiece. The coordinate measuring apparatus includes: a probe head having a probe pin for contact scanning the surface; a control for driving the probe head in accordance with desired data along a pregiven path corresponding essentially to the desired geometry of the surface; a device for detecting a deflection of the probe pin and for supplying control signals proportional to the deflection; a two-stage controller connected to the device for receiving the control signals and for correcting the path in response to the control signals; and, the two-stage controller including: a first stage operating in response to the control signals; and, a second stage which becomes active only when the control signals representing the deflection ($\vec{Ai}$) of the probe pin have reached a predetermined amount.

According to another embodiment of the invention, the coordinate measuring apparatus includes: a probe head having a probe pin for contact scanning the surface; a control for driving the probe head in accordance with desired data along a pregiven path corresponding essentially to the desired geometry of the surface; a first device for detecting a deflection of the probe pin and for supplying first control signals proportional to the deflection; a second device for detecting the force of the probe pin acting on the workpiece and for supplying second control signals proportional to the force; a two-stage controller connected to the first and second devices for receiving the first and second control signals and for correcting the path in response to the control signals; and, the two-stage controller including: a first stage operating in response to the first control signals; and, a second stage which becomes active only when the second control signals, representing the force ($\vec{F}$) of the probe pin acting on the workpiece, have reached a predetermined amount.

The solution provided by the invention joins the advantages of the two different controls mentioned initially with respect to the state of the art in that the solution permits relatively high scanning speeds as well as tolerating large deviations between the desired and actual geometries. This is achieved in that, as previously, the probe head is driven on a pregiven path in correspondence to the desired data but simultaneously, the path data are modified during the scanning movement in correspondence to a deflection of the probe pin which begins to become apparent.

It is advantageous when the desired data comprise not only points whose coordinates can be approached by the control but also contain pregiven normal vectors which define the orientation of the workpiece surface. In such a case, the first control stage can be so aligned that only the control deviation, which occurs in the direction of the particular normal vector, is considered and controlled out. This has the consequence that the probe ball, during scanning in the pregiven path (when the probe ball is not in a pregiven desired point) then could have an offset in the direction of the surface normal, that is, the individual points of the sequence of the desired data are shifted in the normal direction in front of the actual workpiece surface in the event that the desired path should run into the workpiece surface.

The second control stage advantageously controls out the control deviation which occurs in the direction of the probe deflection. In this way, sudden projecting edges and corners can be driven around which the probe pin would otherwise move against without warning and without being braked which would be the same as a collision wherein the probe pin would break off.

BRIEF DESCRIPTION OF THE DRAWINGS

The invention will now be described with reference to the drawings wherein:

FIG. 1b is a detailed schematic of the controller 26 of the control shown in FIG. 1a;

FIG. 1c is a block circuit diagram of an alternate embodiment for the controller 26 of FIGS. 1a and 1b;

FIG. 2 is a schematic which shows the pregiven scanning path and the actual surface of a workpiece during the scanning movement by the probe pin of the probe head 2 of FIGS. 1a and 1b;

DESCRIPTION OF THE PREFERRED EMBODIMENTS OF THE INVENTION

Figure 1A:
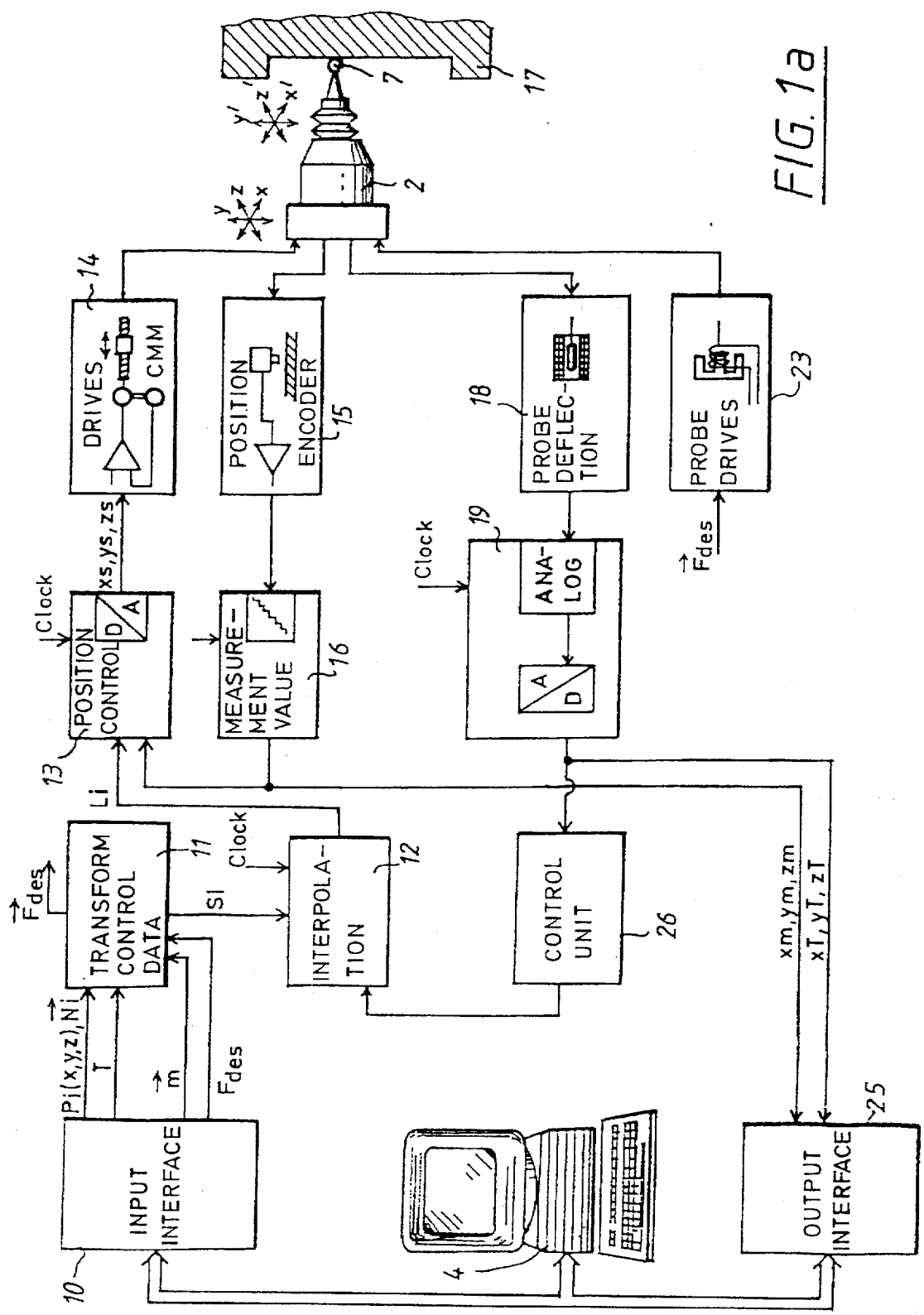
FIG. 1a is a block circuit diagram showing the essential components of the control of the coordinate measuring apparatus which operates in accordance with the invention.

The control of the coordinate measuring apparatus is shown in FIG. 1a with its essential functional components. The control is connected via a receiving or input interface 10 and a transmitting or output interface 25 to an evaluation computer 4 of the apparatus not shown here in greater detail. The following data are transmitted to the control via the input interface 10:

(a) the transformation matrix T which defines the position of the workpiece coordinate system (WKS) in the machine coordinate system (MKS) of the coordinate measuring apparatus;

(b) the vector $\vec{m}$ which defines the offset of the center point of the probe ball in the machine coordinate system from a reference point on the probe head 2 of the apparatus; and, (c) the amount of the measuring force (Fdes) which the probe is to apply to the workpiece.

Furthermore, those data are transmitted via the input interface 10 which are necessary for describing the desired contour to be scanned by the probe ball. These data are, for example, the point sequences Pi(x, y, z). At the same time, and to the extent available, the normal vectors Ni to the surface of the workpiece 17 to be measured can be transmitted at this interface. The normal vectors Ni are assigned to the individual points Pi(x, y, z).

The most important component of the control in FIG. 1 is one or more microprocessors. Accordingly, several of the function components shown in FIG. 1a are not realized in the form of hardware but are part of the firmware of these microprocessors. This applies, for example, also for the function component 11 which follows the input interface 10. The function component 11 is identified in FIG. 1a with the legend "transform control data" and computes the path data from the received data. With this path data, the probe ball 7 is driven with respect to the workpiece 17. These path data (Si) are transferred via a coordinate transformation into the control system, that is, the machine coordinate system (MKS).

In the function group 12, the processed discrete path points Si, which are to be scanned, are interpolated in accordance with a pregiven algorithm or in accordance with a spline algorithm. This interpolation is performed at the system clock frequency of the control and the pregiven algorithm can, for example, be linear. Position desired values (Li) are transmitted to the downstream position controller 13 for the drive of the three measurement axes of the coordinate measuring apparatus.

The position desired values, which are generated in the position controller 13, are subsequently converted into analog quantities and are transmitted as analog position quantities to the three drives 14 for the x, y, and z axes of the coordinate measuring apparatus. Likewise, the displacement measuring systems 15 of the coordinate measuring apparatus are connected to the position controller 13 via the function component 16 identified in FIG. 1a as "measurement value". This component cyclically detects the positions of the probe head 2 in the machine coordinate system (MKS) and closes the position control loop for the three measurement axes of the coordinate measuring apparatus.

The control of FIG. 1a likewise includes the electronic unit 18 for further processing the signals outputted by the measurement value transducers in the probe head 2. These signals define the deflection of the probe pin in the three spatial directions when the probe ball 7 makes contact with the workpiece 17. The position signals coming from the measurement value transducers and processed in the electronic unit 18 are converted into digital values in the function component 19. These digital output values (xT, yT, zT) are likewise applied to the output interface 25 in the same manner as the coordinate measurement values (xm, ym, zm) from the displacement measurement devices for the measurement carriage of the apparatus. These digital output values are needed by the computer 4 to compute the measurement result.

The control of FIG. 1 furthermore includes the drives for the deflection of the probe pin in the probe head 2. These drives comprise force generators such as linear motors or plunger electromagnets. The drives deflect the probe pin in response to a pregiven signal in the three spatial directions (x, y, z). Likewise from the function component 11, the corresponding function component 23 "probe drives" receives the data as to magnitude and direction of the measurement force $\vec{F}$des to be adjusted. The function component generates this data from the transmitted data as to the magnitude of the measuring force and from the normal vectors $\vec{N}i$. In the embodiment described, the direction of the measuring force $\vec{F}$des is always pregiven in the direction of the surface normal $\vec{N}i$.

Further information as to the control described above is provided in U.S. Pat. No. 5,471,406 incorporated herein by reference.

With the control described up to now, only workpiece surfaces can be scanned which coincide with the pregiven desired geometry within the permissible deflection range of the probe pin and to which desired geometry the path data is referred. To eliminate this limitation, a controller 26 is provided which receives the digital signal of the component 19 defining the probe deflection. This controller 26 is likewise integrated into the firmware of the microprocessor of the control and operates as will be described below.

The detailed illustration of the controller 26 in FIG. 1b shows that the controller is configured in two stages. In the first stage 27, the signal of the function component 19 is converted into a control signal which points in the direction of the surface normal $\vec{N}i$ of the next support point Si to be driven to. In this context, only the component of the probe deflection Ai is used which is effective in the direction of the surface normal and is further processed and components which deviate therefrom are cancelled. By this amount so computed, the next point Si to be driven to is displaced away from the workpiece surface, that is, the coordinates of this point are shifted in the direction of the control quantity $\vec{V}Si$. All further points defining the desired path are also displaced. However, the displacement is not for all points in the same direction. Rather, the control for each point is always effective only to that extent which the projection of the probe deflection $\vec{A}i$ yields to the normal direction $\vec{N}i$ of the particular point Si.

The above is shown in FIG. 2. There, the actual workpiece surface is identified by reference numeral 17a and the desired path along which the probe ball is to be guided is identified by S. This desired path S, for example, has been interpolated as a spline between the points (S1, S2, S3, S4 and S5) which have been transmitted by the computer 4 to the control together with the corresponding normal vectors (N1, N2, N3, N4 and N5). Assume that for the point S1, a probe deflection in the direction of arrow A1 takes place because, for example, the actual geometry of the workpiece surface 17a does not correspond to the desired data. Then, the points (S2 to S5) are displaced by projection onto the particular normal vector in the manner described, that is, the points are displaced in the direction of the measuring force and transferred into the points (S2' to S5'). The shift of the points along which the probe head is controlled in the course of the closed-loop control always takes place perpendicularly to the workpiece surface.

If the workpiece error cannot be controlled out in the direction of the given surface normal because, for example, the contact direction in an inner corner is recognized too late as a consequence of a form or position error or is changed too abruptly, then the second stage 28 of the controller 26 becomes active. This second stage becomes only then active when the deflection $\vec{Ai}$ exceeds a predetermined threshold value or when the forces, which build up perpendicularly to the contact or normal direction between probe pin and workpiece, become too great.

The first possibility is shown in FIG. 1b. There, a comparison is made in a comparator 29 as to whether the data as to the probe deflection $\vec{A1}$ supplied by the function component 19 exceeds a preadjusted threshold value 30. Only then does the second stage 28 of the controller 26 become active and effects a shift of the desired points Si in the direction of the probe deflection $\vec{Ai}$. Stated more precisely, the shift is in the direction of the projection of the probe deflection $\vec{Ai}$ in the plane N⊥ defined by the particular measurement force vector to which the measurement force vector is perpendicular.

Figure 3:
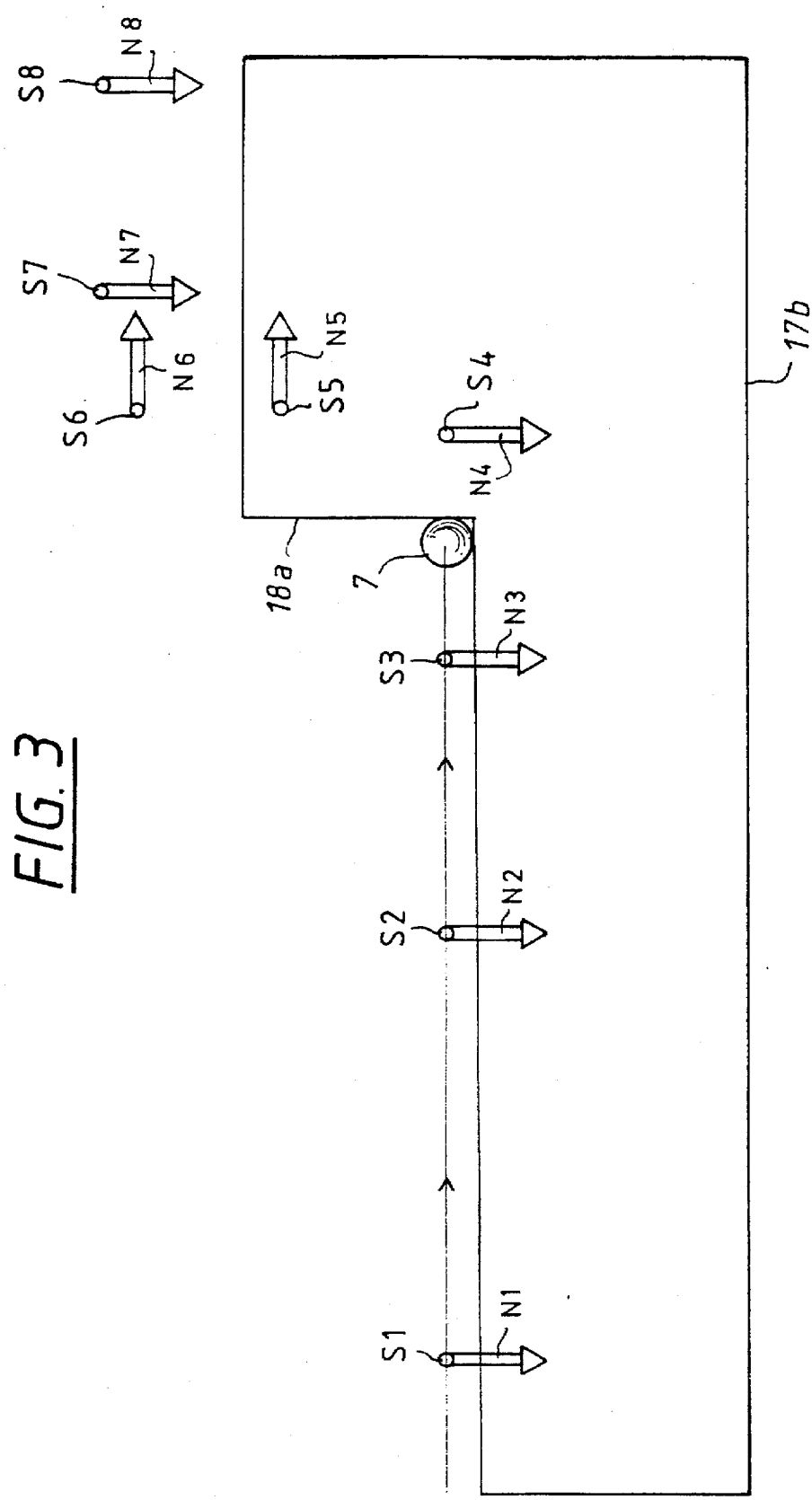
FIG. 3 is a schematic representation of a section through a workpiece surface in a plane which contains the scanning path and shows the operation of the second control stage 28 of the controller 26 of FIG. 1b; and, FIG. 4 is a flowchart which shows the operation of the controller 26 of FIG. 1b.

The purpose of this second control stage is shown in FIG. 3. The workpiece 17b shown in FIG. 3 has a projecting edge 18a and the points (S4 and S5) lie rearward of this edge. If now the probe pin with the probe ball 7 is moved toward this edge 18a, then the first control stage (which only operates in the direction of the surface normal, for example, of the point S4) can in no event displace this point in the direction toward the workpiece surface. In this situation, a probe deflection results suddenly perpendicularly to the measurement force direction or normal direction N3. Notwithstanding a starting deflection, the probe head would travel further in direction toward the point S4 and the probe pin would break off.

Figure 4:
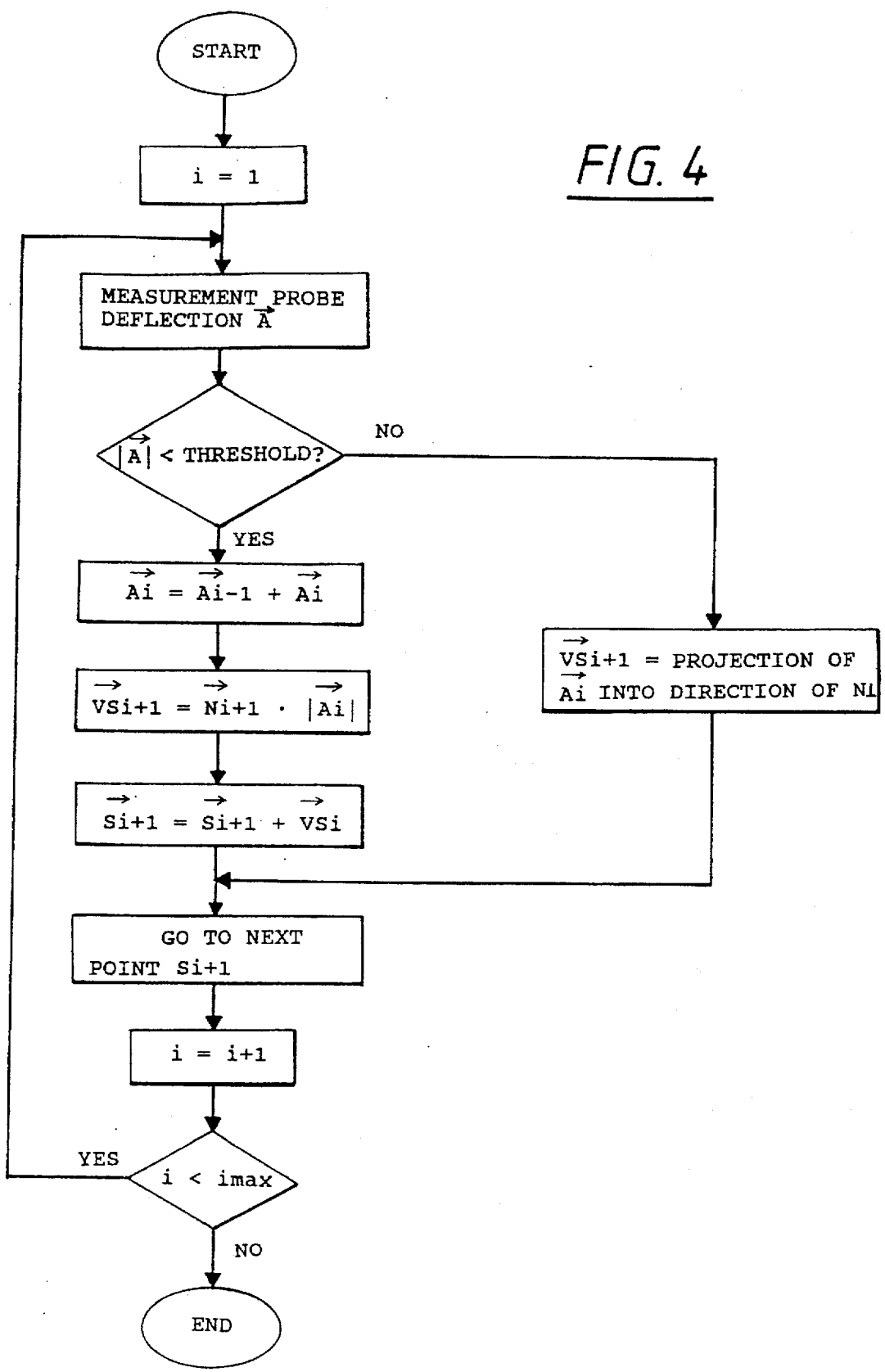

The second control stage however, ensures that in such a case where the probe pin deflection has exceeded a predetermined amount, the point S4 is nonetheless pushed out from the workpiece toward the edge 18a. As soon as the coordinates of the point S4 then coincide with the coordinates of the probe ball 7, the direction of travel changes because the probe ball then is set in motion in a direction toward the point S5 and attempts to reach the same. Here, the first stage of the control again becomes active because then the normal vector $\vec{Ni}$ (which simultaneously give the direction of the superposed measuring force $\vec{Fdes}$) again points toward the workpiece surface. In this way, the probe head has driven itself free. The control described above is presented once more in the flowchart of FIG. 4 to provide an overview.

In the embodiment described, exceeding a pregiven threshold value for the probe deflection was applied as a criterion for the activation and use of the second control stage. As an alternative, the ratio of the pregiven contact force $\vec{Fdes}$ to the actual force between probe ball and workpiece (or, more specifically, the force perpendicular to the pregiven force component F1 acting in the desired direction) can be used as a criterion for the activation and use of the second control stage. This case is shown in the function block diagram of FIG. 1c. The actual occurring measuring forces F⊥ can, for example, be determined via measurement resistors in the current loops of the plunger coil systems which define the drives 23 for the deflection of the probe pin.

The control operation of the second control stage becomes active only after a pregiven threshold value and then displaces the next points to be driven to in proportion to the force or the deflection to which the normal vectors of the points are perpendicular. For this reason, uninterrupted movement out of the situation shown in FIG. 3 is then always ensured when the traveling speed is not too high in proportion to the control speed. With the input of the support points, the necessity is therefore present to position these points more or less closely in correspondence to the errors of the workpiece to be expected so that, on the one hand, the control can function as a protective mechanism while, on the other hand, the traveling speed is not too slow and the total measuring time does therefore not become too great.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring the surface of a workpiece, the coordinate measuring apparatus comprising:

a probe head having a probe pin for contact scanning said surface;

a control for driving said probe head in accordance with desired data along a pregiven path corresponding essentially to the desired geometry of said surface;

a device for detecting a deflection of said probe pin and for supplying control signals proportional to said deflection;

a two-stage controller connected to said device for receiving said control signals and for correcting said path in response to said control signals; and, said two-stage controller including: a first stage continuously operating in response to said control signals; and, a second stage which becomes active only when the control signals representing the deflection $(\vec{Ai})$ of the probe pin have reached a predetermined amount.

2. The coordinate measuring apparatus of claim 1, wherein said desired data includes: points (Si) having coordinates to which said control drives said probe head and pregiven normal vectors $(\vec{Ni})$ defining the orientation of said surface; and, said first stage being adapted to control out only the control deviation in the direction of the particular normal vector $(\vec{Ni})$.

3. The coordinate measuring apparatus of claim 2, said probe head including a measuring force generator for generating a measuring force and said control being adapted to always vectorially set said measuring force in the direction of the particular pregiven normal vector $(\vec{Ni})$.

4. The coordinate measuring apparatus of claim 1, wherein said second stage is adapted to control out the control deviation occurring in the direction of the probe deflection ($\vec{Ai}$).

5. The coordinate measuring apparatus of claim 1, wherein said controller is adapted to operate digitally in such a manner that the control quantity ($\vec{V}Si$) of said controller displaces the position of said points (Si) which define the path to be travelled by said probe head.

6. The coordinate measuring apparatus of claim 5, wherein: the displacement of each point (Si) by said first stage always takes place only in the direction of the normal vector ($\vec{Ni}$) assigned to said point (Si); and, the extent of said displacement corresponds to the sum of the control deviations projected on said normal vector ($\vec{Ni}$).

7. The coordinate measuring apparatus of claim 6, wherein the displacement of each point (Si) by said second stage is always only perpendicular to the normal vector of the last point scanned and in the direction of the projection of the probe deflection ($\vec{Ai}$) to the plane (N⊥) defined by said normal vector ($\vec{Ni}$).

8. A coordinate measuring apparatus for measuring the surface of a workpiece, the coordinate measuring apparatus comprising:
   a probe head having a probe pin for contact scanning said surface;
   a control for driving said probe head in accordance with desired data along a pregiven path corresponding essentially to the desired geometry of said surface;
   a first device for detecting a deflection of said probe pin and for supplying first control signals proportional to said deflection;
   a second device for detecting the force of said probe pin acting on said workpiece and for supplying second control signals proportional to said force;
   a two-stage controller connected to said first and second devices for receiving said first and second control signals and for correcting said path in response to said control signals; and,
   said two-stage controller including: a first stage continuously operating in response to said first control signals; and, a second stage which becomes active only when the second control signals, representing the force ($\vec{F}$) of said probe pin acting on said workpiece, have reached a predetermined amount.

9. The coordinate measuring apparatus of claim 8, wherein: said desired data includes: points (Si) having coordinates to which said control drives said probe head and pregiven normal vectors ($\vec{Ni}$) defining the orientation of said surface; and, said first stage being adapted to control out only the control deviation in the direction of the particular normal vector ($\vec{Ni}$).

10. The coordinate measuring apparatus of claim 9, said probe head including a measuring force generator for generating a measuring force and said control being adapted to always vectorially set said measuring force in the direction of the particular pregiven normal vector ($\vec{Ni}$).

11. The coordinate measuring apparatus of claim 8, wherein said second stage is adapted to control out the control deviation occurring in the direction of the probe deflection ($\vec{Ai}$).

12. The coordinate measuring apparatus of claim 8, wherein said controller is adapted to operate digitally in such a manner that the control quantity ($\vec{V}Si$) of said controller displaces the position of said points (Si) which define the path to be travelled by said probe head.

13. The coordinate measuring apparatus of claim 12, wherein: the displacement of each point (Si) by said first stage always takes place only in the direction of the normal vector ($\vec{Ni}$) assigned to said point (Si); and, the extent of said displacement corresponds to the sum of the control deviations projected on said normal vector ($\vec{Ni}$).

14. The coordinate measuring apparatus of claim 13, wherein the displacement of each point (Si) by said second stage is always only perpendicular to the normal vector of the last point scanned and in the direction of the projection of the probe deflection ($\vec{Ai}$) to the plane (N⊥) defined by said normal vector ($\vec{Ni}$).

15. The coordinate measuring apparatus of claim 1, wherein said first stage continuously operates in response to said control signals to control said probe head toward said surface of said workpiece.

16. The coordinate measuring apparatus of claim 8, wherein said first stage continuously operates in response to said control signals to control said probe head toward said surface of said workpiece.

* * * * *